United States Patent [19]
Ernsberger

[11] 3,811,859
[45] May 21, 1974

[54] PROCESS AND APPARATUS FOR ELECTROLYTICALLY GENERATING STIRRING BUBBLES IN A GLASS MELT

[75] Inventor: Fred M. Ernsberger, Pittsburgh, Pa.
[73] Assignee: PPG Industries, Inc., Pittsburgh, Pa.
[22] Filed: June 9, 1972
[21] Appl. No.: 261,482

[52] U.S. Cl.......................... 65/135, 65/136, 65/178
[51] Int. Cl............................................... C03b 5/18
[58] Field of Search ............ 65/178, 179, 180, 134, 65/135, 136

[56] References Cited
UNITED STATES PATENTS
| | | | |
|---|---|---|---|
| 2,122,469 | 7/1938 | Hitner | 65/136 X |
| 1,928,288 | 9/1933 | Henry | 65/134 X |
| 1,955,451 | 4/1934 | Blau | 65/134 X |
| 1,069,255 | 8/1913 | Héroult | 65/135 X |

Primary Examiner—Arthur O. Kellogg
Attorney, Agent, or Firm—E. Kears Pollock; John W. Linkhauer; Chester A. Johnston, Jr.

[57] ABSTRACT

Improvements are disclosed in a process wherein molten glass is subjected to the agitation of small bubbles generated by electrolysis of molten glass. This gas generation usually is conducted at the anode and the effect of cathodic reactions is advantageously held to a minimum by conducting the electrolysis of glass which contains ferric iron or the like higher valent ion and limiting the degree of electrolysis of glass contacting the cathode so that reduction reactions at the cathode are largely confined to reduction of such higher valent ion to a lower valent state without electrodepositing metal. The oxygen bubbles so generated can be effectively caused to agitate the molten glass and generate or enhance the flow of convection currents, thereby improving homogeneity of the glass. They can also be used to sweep out dissolved gases such as nitrogen or water vapor and produce glass which is free or essentially free of such gases. The gas bubbles generated as above described are produced by electrolysis of the glass between anode and cathode which are separated by a solid electrolyte such as beta alumina.

21 Claims, 4 Drawing Figures

PROCESS AND APPARATUS FOR ELECTROLYTICALLY GENERATING STIRRING BUBBLES IN A GLASS MELT

BACKGROUND OF THE INVENTION

This invention relates to the processing of molten glass and is particularly concerned with improvements in melting glass, especially in melting glass on a continuous basis to provide a continuous process for forming flat glass sheet or other glass articles.

In the continuous manufacture of flat glass sheet, whether by the float, plate or sheet glass process, glass forming ingredients for soda-lime glass are fed into one end of a glass melting furnace which contains a pool of molten glass. The glass is heated primarily by flames produced by burning fuel disposed above the pool and the glass forming ingredients are melted together to merge with the pool. Molten glass is withdrawn from the other end of the melting zone to a refining or fining zone in which the glass is maintained at a lower temperature and is held for a time to permit entrapped gas to escape, to permit the glass to become homogeneous or substantially so, and to prepare it for formation into sheet.

In the float process the thus fined glass is delivered to the surface of a pool of molten metal, e.g., tin and the sheet is formed by floating on the tin and then cooled and withdrawn. In the plate process the glass is formed into a sheet by passage through forming rolls; the sheet is cooled and then ground and polished to provide a smooth surface. In the sheet process, glass is withdrawn as a sheet from a pool of fined glass and is cooled and cut into sheet segments.

Homogeneity in glass is important, particularly in transparent products such as lenses and windows whose principal function is to permit undistorted viewing. The cause for optically objectionable distortion is local variations in chemical composition of the glass, which lead to variations in refractive index and sometimes in surface contour. Homogeneity defects have various names, such as ream, cord, striae, knots, etc. Glass freshly melted from commercial ingredients is always very inhomogeneous because the various components of the glass are initially supplied as relatively coarse particles of different chemical compounds (sand, limestone, soda ash), and the glass is not fully homogeneous until all composition gradients have been eliminated. The elimination of composition gradients is difficult because of the extremely high viscosity of the melt. The temperature limitations of commercially available refractories make it impractical to heat a sodalime-silica glass beyond a temperature corresponding to a viscosity of about 100 poises, which is approximately the viscosity of honey at 70°F.

Mechanical stirring of glass at these temperatures is impractical for all but the most exacting applications, because platinum is essentially the only material of which a stirrer can be made. Furthermore, Reynolds-number calculations show that it is impossible to induce true turbulence in a liquid of such a high viscosity. In the final analysis, the only mechanism of achieving chemical homogeneity in glasses is molecular diffusion. To aid the diffusion process, the glass-maker melts the glass at the highest practicable temperature. Having done this, the generally applicable technique is that of attenuating the molten glass. Attenuation has the effect of shortening the path between elements of the volume having different compositions, which obviously facilitates greatly the diffusive exchange of material between these elements. In practice, attenuation cannot be accomplished by simply stretching all elements of the glass; instead, means are provided for producing shear in the glass. Shear occurs whenever neighboring elements of glass move at different velocities. Shear will be produced whenever the contents of the tank are induced to flow by the application of a force in a selected region of the melt. For example, a very important system of flows is customarily induced in commercial glass-melting tanks by deliberately concentrating the application of heat in a centrally located region of the melter. The hotter portion of the glass, being of lower density, naturally rises, while the surrounding cooler glass sinks, in the manner of the well-known "thermal siphon" effect. The rising portion of the glass is known in the art as the "spring zone."

To enhance homogeneity and/or to improve the melting conditions or to increase the rate of melting and fining, it has been the practice to introduce gas bubbles into the glass in order to agitate or stir the glass in the molten pool. This gas is introduced through conduits, ports or orifices extending through the bottom of the glass furnace either to or above the upper face of the floor of the furnace. The diameter of the orifices is small, although rarely below about one-sixteenth inch, because otherwise the orifice tends to be plugged by the molten glass.

Molten glass is a viscous liquid, the viscosity of lime soda silica glass is a melting zone usually being about 100 poises or more, rarely being below 10 poises or above 1,000 poises. At least partly because of this high viscosity the bubbles which are formed even by these small orifices are usually large, such as 3 to 6 inches in diameter. Either a bubble does not become dislodged until it has grown to that size, or smaller bubbles that are dislodged quickly rise and join with others to form a bubble of such larger size. These large bubbles contain an appreciable amount of gas. When they rise to the surface they explode or break with enough force to cause entrapment of furnace gas in the molten glass at the surface. Thus, the use of such orifice bubblers is thought to produce seed in the glass. Furthermore, in view of the large size of the bubbles and in order to avoid mechanical crowding of equipment, the orifices have been spaced a considerable distance (usually one or more feet) from one another.

Many patents describe the use of such bubblers, including the following U.S. Pat. Nos.: 2,261,034, 2,387,222, 3,558,297, 2,274,643, 3,414,396, 3,104,967, 3,198,618, 3,305,340, 2,909,005, 3,375,095, 3,463,626, 3,239,324, 3,294,512, 3,330,639, 3,294,509.

As described in a copending application for U.S. Letters Pat. Ser. No. 261,498, filed simultaneously with the present application by Thomas John Nier, a process and apparatus for treating glass is disclosed according to which glass may be effectively melted.

According to this invention, glass may be effectively melted, purified, attenuated and/or homogenized and/or have flow (convective) currents generated therein at or close to the melting zone or even in the fining zone, by electrolytically generating bubbles in the glass through electrolysis of the glass. Effective homogenization and increased rate of melting is achieved by electrolytically generating enough of the small bubbles to cause substantial upward mass flow of the glass above a bubbleforming electrode. Such bubbles are formed by passing direct electric current to an electrode, preferably an anode, which is in contact with and generally immersed in a pool of molten glass so that electrolysis of the glass takes place. As a consequence of this electrolysis, gas (usually pure oxygen) is evolved on the surface of the electrode and escapes from the electrode in the form of small bubbles and rises through the glass, thereby contacting and influencing the major portion of the glass in the pool. By disposing the electrode (or a plurality of electrodes) across the path of flow of the glass, a body or curtain of rising bubbles is established across the path which carries glass upward from a lower part of the pool and stirs or agitates the pool and/or creates upwardly flowing convection currents in the pool (which are balanced by downward flows elsewhere). Advantageously, the electrode is located below the top of the lower half, preferably below the top of the lower third of the pool and thus the bubbles rise at least through one half and preferably not less than two thirds of the depth of the pool, and the flow (convection) current is established in the level above the electrodes. Generally, this electrode is entirely in such lower level that the evolved bubbles rise directly from the upper surface thereof, whereas if the electrode extends for example as a rod upwardly into the pool, the bubbles tend to flow along the electrode. Thus, in the former case, a free or unobstructed space is provided above the electrode provided by horizontally oriented electrode surface in the lower part of the pool since solid barriers to flow; i.e., electrodes are not located in this free space. This facilitates the unobstructed effect of the generated bubbles on the flow pattern of the pool and ensures establishment of enhancement or other desired modification of convection currents in the glass pool.

Most commonly and preferably the electrode is disposed in or only slightly above the upper surface of the floor of the furnace. In this way the electrodes do not project upward into the flowing currents of the pool to the extent that they hinder or obstruct the flow patterns of such currents. Of course, the rising bubbles do influence and may enhance or even change substantially the location or intensity of these currents. The extent of their influence is readily controllable by adjusting the voltage imposed on the electrode and thus raising or lowering direct current density to which the gas forming electrode is subjected with consequent increase or decrease respectively of the amount of gas involved.

The fact that bubbles can be induced to form adjacent electrodes in molten glass is not new per se. Thus, U.S. Pat. No. 3,530,221, Column 9, refers to the fact that bubbles formed when a DC component was imposed upon a pair of electrodes used to melt glass by alternating current. However, the DC component is held low enough in the practice of that patented invention so that bubbling is "nearly stopped." The small amount of bubbles generated would not be expected to produce substantial mass flow of the glass. U.S. Pat. No. 2,263,549 also discloses bubble formation adjacent an electrode used for electrically heating glass with alternating current. However, these bubbles are generated by high temperature adjacent the electrode or by reaction of the electrode with the treated substance. Deliberate electrolysis of the glass to produce bubbles is not suggested, and in fact, the object of the patent is to eliminate such reactions at the electrode surface by evacuating the electrode or forcing gas through the electrode to sweep the bubbles away. See also U.S. Pat. No. 1,785,888.

In contrast with the prior art, the direct-current or unipolar component of the voltage impressed across the electrodes according to the invention described in the above-identified application of Nier is maintained sufficient to electrolytically generate enough gas bubbles to substantially affect or create significant flow currents in the pool and thus even to change the temperature differential or profile from bottom to the top of the pool. Thus, the bottom glass temperature may be raised at least 10°F. and frequently 25° to 50°F. or more across the path of glass flow in the melting tank and the temperature differential between the top of the pool to the bottom of the pool be reduced substantially, for example, 150°F. or more. Furthermore, the glass is more readily made homogeneous.

An especial advantage accrues by generating the bubbles electrolytically because such bubbles are small in diameter and also can be potentially generated at a multiplicity of sites over the continuous surface of the electrode thus producing a buoyant volume of glass having substantial dimension, for example, 5 to 15 centimeters or more.

Conventional bubblers are operated in such a way that 3–4 cubic feet of air or other gas escapes each hour through each orifice, and 12–15 such orifices may be used across the 30 foot width of a tank producing 350–400 tons of glass per day. A certain amount of mechanical work is done on the molten glass by a given volume of gas in rising a certain distance, independently of the chemical identity of the gas and of the size of the bubbles. Nevertheless, the homogenization efficiency of a given flow of gas is far greater when the gas is supplied as a great many small bubbles, rather than as a few large bubbles. There are two reasons for the greater efficiency of small bubbles.

First, small bubbles are more effective at lifting glass, hence produce upward flow of glass on a larger geometrical scale. A given volume of gas, dispersed as small bubbles throughout a given volume of glass, causes that whole volume to experience a buoyant upward force, whose magnitude can be calculated from the mean density of the glass-gas mixture. It can be estimated that the inclusion of a uniformly-distributed 1 percent of voids in molten glass is roughly equivalent to the thermal expansion that would be produced by heating the glass to 5,000°F., if such a thing were possible. The flows induced by such large buoyant forces are similar in character to those existing in the conventional tank owing to the existence of a "hot spot" and a thermal "spring zone;" however, they are very substantially larger in magnitude and hence more effective in their mixing and homogenizing action. In contrast, the flows induced by the rising of the same volume of gas as a single bubble are very restricted geometrically. The molten glass parts above the bubble and closes again behind it, leaving all elements of the glass in very much their initial position, save for a slight upward displacement. There is not even much shear produced in the vicinity of the bubble surface, because of the inviscid nature of gases. In other words, the passage of a bubble produces much less shearing in the melt than would be produced by the passage of a solid globule of the same dimensions.

Second, small bubbles produce a "fine-grained" mixing action, superimposed on the large-scale, top-to-bottom circulating flows. That is, within the upwardly-flowing current of glass, which we will term the "bubble curtain", each individual bubble is rising with respect to the glass immediately around it, at a rate that can be estimated by an application of the well-known Stokes Law. Thus, the micro-flows around each bubble add their effect to that of the macro-flows around the bubble curtain as a whole.

It is not practicable to gain the benefits of small bubbles by use of conventional orifice bubbling technology. It would be possible to generate small bubbles from conventional orifices, given a sufficiently small orifice, but to do so would require throttling down the rate of gas flow per orifice to such a low level that the effect produced per orifice would be negligible. Only by using thousands of closely-spaced orifices, each operated at a very low flow rate, could the effect of electrolytic bubbling be simulated.

The natural function of the gas evolving electrode is such that numerous bubbles grow simultaneously from closely-spaced locations on the electrode surface. Such locations are frequently spaced as closely as ten microns; that is, approximately the crystallite size of the electrode; however, some of the bubble generation sites are more active than others, so the sites that actually predominate may be typically spaced at distances more like one millimeter apart, and seldom more than 25 millimeters or one inch apart. Surface tension, viscosity, and buoyant effects also play a role in determining the actual size of the bubbles at the instant of their release from the electrode and in practice the bubble size can be varied at will between about one millimeter, which is the minimum desirable size, and about 25 millimeters, the maximum desirable size; and at high viscosities, the bubble size can be made larger. The most useful range of sizes is about 5 to 15 millimeters.

Further, the small bubbles escape from the electrode surface fast enough so they do not merge appreciably with other bubbles and thus are about the same size when they reach the surface of the pool. Thus, they break with much less violence than do the larger bubbles formed by gas introduction through orifices and have less tendency to cause furnacegas entrapment in the molten glass. Further, the small bubbles have greater surface area per unit of gas in the bubble and, therefore, are more effective in absorbing or sweeping entrapped gas or seeds from the glass.

In contrast to conventional orifice bubblers, the electrodes provided according to this invention provide large potential bubble-generation areas; i.e., 25 to 100 square centimeters or more. Also, these areas can have a substantial dimension measured horizontally. The length or width of such a body will depend upon the size of the furnace and in small furnaces may be 20 or more millimeters in width. However, for large commercial continuous furnaces, the electrode should be 15 to 60 centimeters in width or more, and thus this bubble generation can be established over a volume of glass which is 15 or more centimeters long (downstream measurement), 15 or more centimeters wide (across the flow of glass) and the height of the pool measured from the electrode to the pool surface.

Even where anodes or other gas forming electrodes are separated into sections or individual electrodes which are spaced from each other, the area enclosing the electrodes provide an area of bubble generation sites on the electrode surfaces which is large with respect to the area under that part of the pool where bubbles create an upward flow. Whereas the bubble generation area defined by the sum of the areas of bubble orifices is small (often less than 1 percent) of the horizontal area under that portion of the pool where the bubblers produce upward circulation, the potential bubble generation of an electrode surface under such portion is well over 10 percent, usually being 25 to 100 percent of the area under such portion.

The location of the above-mentioned spring zone is influenced by the thermal conditions of the pool, which in turn are influenced by the locations where heat is applied, the temperature of applied heat, the cooling effects due to loss of heat through furnace walls, etc. By locating the gas forming electrode underneath or essentially in the lower part of the spring zone, the rate and extent of glass circulation may be increased. Further, this location may be effectively stabilized or fixed because of the strong influence of the rising bubbles produced by electrolysis.

Thus, homogeneous glass may be produced continuously and with substantial uniformity over periods of many hours, days or even months according to this invention.

The location of the spring zone can be effectively controlled or stabilized by disposing the gas forming electrode under this zone and transverse to the path of flow of glass through the furnace, since if enough gas bubbles are generated they create their own spring zone above the point of gas generation. Whether or not the electrodes are intended to establish and stabilize the location of the spring zone, the electrodes extend transversely to a substantial portion (at least 10 percent and generally over 50 percent or even substantially all) of the path of flow of glass toward the exit end of the furnace. Also, they are normally located in the lower part of the pool. Thus, they are rarely (subject to an exception discussed below) above the top of the lower third of the depth of the pool at the point where the electrodes are located, and in most cases the electrodes are located on or very near to the furnace floor, so the evolved bubbles can influence the entire depth of the pool.

SUMMARY OF THE INVENTION

According to this invention it has been found that the above electrolysis may be effectively conducted by recourse to a solid ionpermeable barrier, membrane or diaphragm; i.e., a solid electrolyte which separates the cathode and the anode. Such barrier thus permits the gas forming electrode to be in contact with the molten glass so that the evolved gas can influence the glass while permitting segregation of the opposed electrode from the glass. For example, the cathode may be segregated from the molten glass by use of a cation-permeable exchange barrier such as beta alumina. The anion may be so segregated by use of an anion-permeable exchange barrier comprising lime-doped or yttria-doped zirconia or other cubic oxide with a fluorite structure. This permits effective use of cathodes or anodes as the case may be which might otherwise be attacked by the electrolyte.

Thus, when a cation-permeable barrier is used, sodium or other cation of suitable size and characteristics may be selectively removed from the glass through the barrier, and when an anion-permeable barrier is used, oxygen or other anion of suitable size and characteristics may be selectively added to the glass through the barrier.

BRIEF DESCRIPTION OF THE DRAWINGS

The above embodiments as well as other features or embodiments of this invention and of related inventions will be more thoroughly understood by reference to the ensuing disclosure, particularly when taken in connection with the accompanying drawings, in which.

DESCRIPTION OF THE PREFERRED EMBODIMENTS

Figure 1:
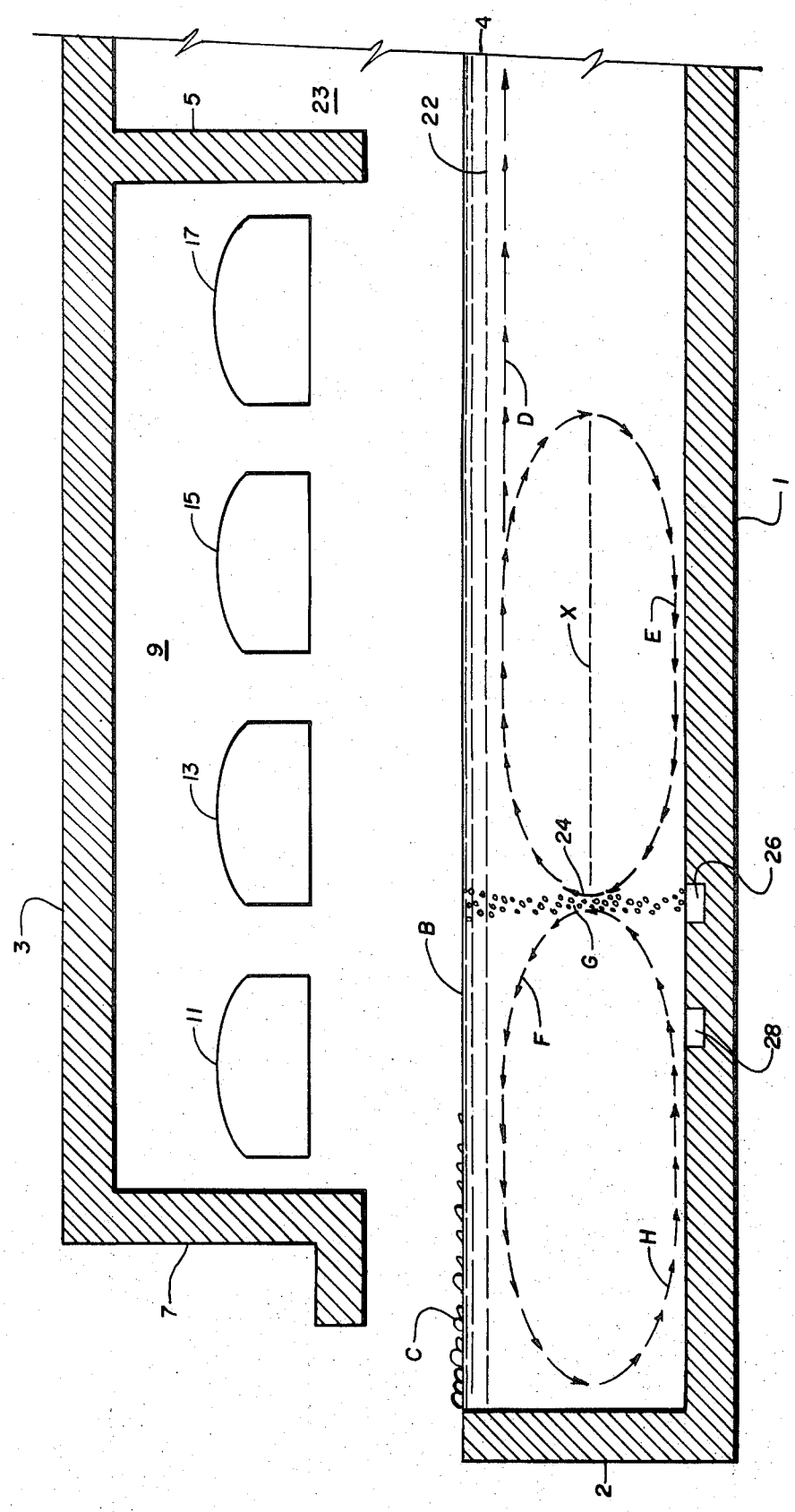
FIG. 1 is a diagrammatic sectional view of a glass melting furnace illustrating the patterns of glass currents in such a furnace and also illustrating how this invention may be applied to such furnace.

As stated, FIG. 1 is a diagrammatic view of a melting furnace suitable for continuously melting glass, particularly soda-lime glass for production of flat glass sheet or ribbon. The melting furnace comprises a bottom 1, front or delivery end and rear end walls 4 and 2, respectively, and a radiant roof 3. The roof has a rear wall 7 and a drop arch 5 and, of course, the furnace is provided with side walls 9 with ports 11, 13, 15 and 17 through which fuel burners (not shown) extend and project flame and hot gases over the glass in the furnace to supply heat thereto. These elements are constructed of refractory material as is well understood in the art.

The front end 4 has a raised portion (not shown) which determines the depth of glass leaving the melting furnace at the exit end.

In the operation of the furnace glass is melted by the heat from the burning fuel; e.g., natural gas, to form a molten pool of glass with a level diagrammatically illustrated at B. Glass forming ingredients are introduced by conventional means at C and melt and gradually merge with the pool. Withdrawal of glass creates a glass flow current in the upper part of the pool as indicated by arrows D to and through the furnace outlet 22 to other parts of the furnace (not shown in detail); e.g., to the fining and/or forming sections 23 thereof. A portion of the current D breaks off as shown by arrows E in the downstream end of the pool, falls to a lower portion of the pool and returns along or somewhat above the furnace bottom 1.

Thus, stream E ultimately flows toward the back or feed end of the furnace and in a direction opposite to the forwardly flowing stream D. Ultimately, stream E joins with a rising stream G in a central area of the furnace called the spring zone 24. A collateral current H merges with currents E and G. Current G wells to or near the surface of the pool, dividing into streams D and F. Stream F flows along or near to the pool surface toward the feed end of the furnace. As a consequence of this circulation, the glass is stirred and homogenized, floating materials C are prevented from entering stream D, and heat is transferred vertically into the pool of glass.

Since in this type of furnace when bubblers are not used, heat is applied primarily from above the pool surface and cooling inevitably occurs along the walls and bottom thereof, the temperature of the surface above current G is substantially above, usually 100° to 150°C or more (rarely more than 400°C) the temperature of glass at the furnace bottom, there being a similar although perhaps smaller temperature differential between currents D and E. The upward flowing current G moves cooler glass to the top for further heating. The temperature differential between top and bottom of the pool may be substantially reduced by recourse to the electrolytic generation of bubbles as herein contemplated. Thus, this differential may be reduced by 10°C or more and if desired, the differential between top and the bottm may be held below 200°C, often 25° to 50°C or below.

Also, this resulting curtain of small electrolytically generated bubbles establishes a type of fluid barrier which essentially divides the glass pool into an upstream portion and a downstream portion. Consequently, a very large or major portion of the glass which is formed by melting in the feed end of the pool must cross or diffuse through the curtain of bubbles, i.e., the spring zone and thus come into contact with such bubbles, i.e., the major part or even all of such glass is influenced by the electrolytically generated bubbles.

As shown in the bottom 1 of the furnace and in this case flush with the upper surface thereof, an electrode 26 is mounted under the spring zone 24. Another electrode 28 is similarly disposed in a position upstream of the spring zone, i.e., at a point between the front end 2 and electrode 26. By suitable means (not shown) a DC electric potential is established between the electrodes 26 and 28 to cause gas to be evolved from the surface of electrode 26 thereby forming bubbles which rise through the spring zone, lifting glass. The bubbles are not drawn to scale. Enough potential is applied to cause sufficient gas bubbles to lift glass and to augment the upward natural flow current of the spring zone. This generation is over a relatively large area and may even by wide enough to widen or otherwise enlarge the cross sectional area of the spring zone.

The electrode 26 is in the form of a flat strip which extends across the width of the furnace and transverse to the flow of glass therethrough, i.e., transverse and often essentially perpendicular to the direction of flow of the current D. Thus, the evolved bubbles form a substantially continuous curtain of bubbles in the spring zone which more or less divide the front part of the pool from the rear part thereof. The degree of glass lift or supplemental lift to the natural stream G is controlled by raising or lowering the current density, which is responsive to raising or lowering the applied voltage. As the current and potential are increased, the volume of gas evolved per unit time increases. Also, the size of the bubbles increases from as low as 1 to 5 millimeters in diameter to 8 to 15 millimeters or even higher.

As a general rule, electrode 26 is made the anode or positive electrode while electrode 28 is made the cathode or negative electrode. Flow of DC current between these electrodes causes gas evolution at at the anode surface. This gas is substantially wholly elemental or molecular oxygen which is evolved probably by electrolysis of silicate and/or sulfate and/or other oxygen containing ions. The electrode 26 may be made of tin oxide.

The cathode 28 is also in the form of a strip which extends across the furnace substantially parallel to the anode and spaced therefrom. The distance of spacing is a matter of convenience; however, the smaller the spacing, the smaller the IR drop through the glass and thus the smaller the overall potential between the electrodes. The cathode may be made of molybdenum or other suitable resistant material. Voltage sufficient to cause the gas evolution is small, a voltage above about 1.5 volts, usually in the range of 2 to 20 volts, being generally sufficient unless the spacing between electrodes is excessive. This direct-current voltage is clearly practical when the electrode spacing does not exceed 35 centimeters. The direct current density imposed on the anode is usually above 5 and generally in the range of 15 to 1,600 amperes per square meter.

In flat glass production, heat is largely supplied by burning gas or other fuel above the level of the pool. Comparatively speaking, little or no heat (generally less than 1 percent and rarely over 5–10 percent of the heat requirements) is generated at the electrodes where the electrolysis (gas generation) takes place.

The exact nature of the anodic reactions which occur is uncertain. However, it appears that silicate ions or other anions all release oxygen in the course of the electrolysis. Thus, the gas evolved normally is substantially pure oxygen.

The rising bubbles not only promote glass circulation, they also tend to scavenge dissolved or entrapped gas in the melt. This is particularly true where as is usually the case, much of the dissolved gas is nitrogen, since the oxygen being relatively pure and relatively free of nitrogen is considered to effectively sweep dissolved nitrogen from the pool.

Oxygen tends to destabilize nitrogen dissolved in molten glass, having in this regard a stronger effect than other gases such as hydrogen or helium. It is desirable to remove dissolved nitrogen, since the nitrogen sometimes tends to come out of solution in the form of very fine seeds that impair the quality of the glass.

The small oxygen bubbles that are produced in accordance with the instant invention are also capable of removing dissolved water from molten glass. This fact is of great importance to manufacturers of light bulbs, since it has long been known that the small percentage of water that is dissolved in the glass from which light bulbs are formed, may have an important effect upon the observed service life of the light bulb.

It is necessary to maintain the anode polarity of the electrode by imposing the DC potential more or less continuously although, of course, minor interruptions are not harmful. After a period of operation of two or more hours, the voltage required to maintain current flow may tend to rise to an undesirable extent, depending on glass composition, current density, glass viscosity, etc. apparently due to an accumulation of products of electrolysis adjacent the electrode. This voltage-drop increase may be eliminated by cutting the potential and allowing the activity of the electrode to become restored. Thus, it may be desirable to discontinue the current flow to the anode periodically and to allow the anode to rest while in contact with the molten glass.

In such a case, it is often desirable to provide an auxiliary or second anode or anode system which may be turned on while the initially operated anode is resting and to alternate operation or activation of the two anodes. Alternatively, where the composition of the electrodes permits it, the polarity of electrodes 26 and 28 may be periodically reversed.

Figure 2:
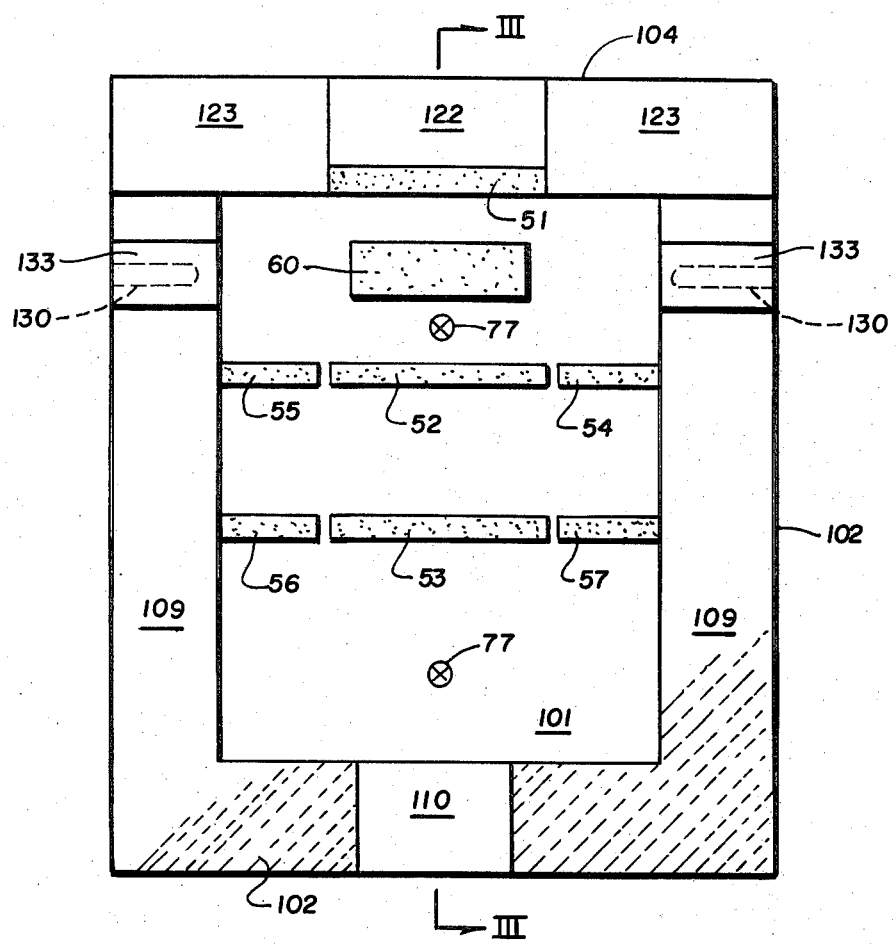
FIG. 2 is a diagrammatic plan of the bottom portion only of a small gas fired melting furnace used in the practice of this invention.
Figure 3:
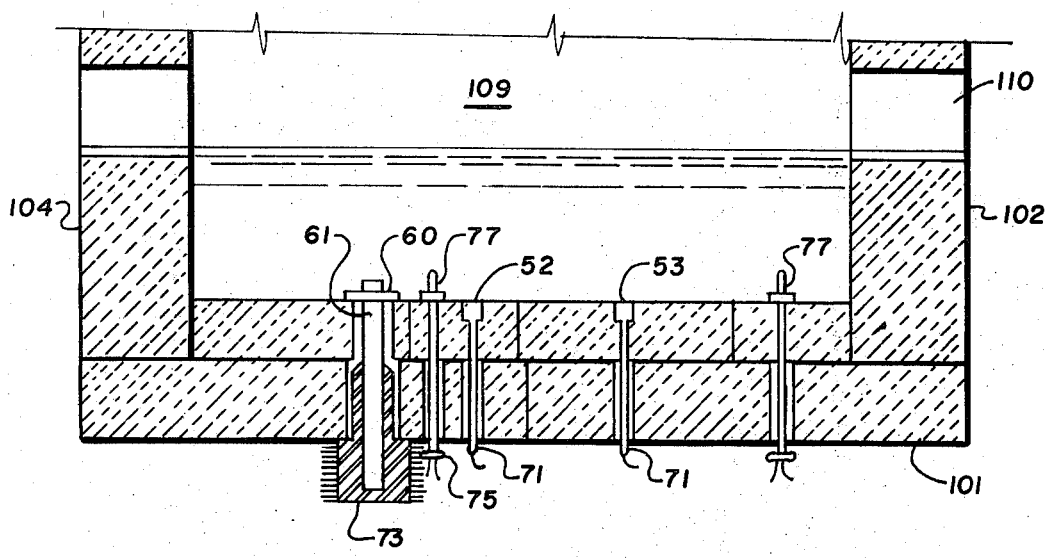
FIG. 3 is a sectional view of the furnace bottom illustrated in FIG. 2 taken along line III-III; and, FIG. 4 is a chart of temperatures observed in operating the furnace illustrated in FIG. 2 with and without imposing a voltage upon the electrodes thereof.

FIGS. 2 and 3 diagrammatically illustrate a bottom portion of a small gas-fired furnace provided with several sets of anodes and several sets of cathodes and of the type used in tests concerning the instant invention. The furnace comprises a bottom 101, side walls 109, exit end wall 102 and feed end wall 104. The wall 104 has a central feed canal 122 bounded on each side by blocks 123 which form the sides of the canal. The wall 102 contains a central exit canal 110. Strip elongated anodes are embedded in the floor of the furnace, including anode 51 adjacent the feed canal and upstream of the cathode 60 and spaced strips 55, 52, 54, 56, 53, and 57 downstream of the cathode 60. These anodes provide an anode surface that extends across the entire width of the furnace as illustrated in FIG. 3. Each of these anodes is provided with connectors 71 which extend through ports in the furnace bottom to a source of DC electric potential, being connected to the positive pole thereof.

Also disposed on the floor of the furnace or projecting a short distance (less than 5 percent of the depth of the pool) above such floor is a cathode 60, which is centrally located and extends across about one half of the interior width of the furnace chamber. This cathode is connected to a rod 61 which extends from the flat cathode through the furnace bottom to the outside of the furnace and is enclosed by a suitable cooler, such as a fin type air cooler 73. Rod 61 is also connected to the negative pole of the DC source by conventional means not shown.

Conveniently, the cathode and the rod 61 are of metallic molybdenum and therefore are readily heat conductive. However, the cathode may be of any other convenient material which is electroconductive and resists the electrochemical attack. Thus, it may be of platinum or palladium metal, or metallic titanium metal coated with platinum, palladium or other platinum-group metal or of tungsten or of an electroconductive oxide or boride of such metals such as titanium boride ($TiB_2$). Also, a pool of molten tin confined in a restricted portion of the bottom of the pool, may serve as a cathode.

The anodes may be of electroconductive tin oxide or other suitable material which is electroconductive and resistant to anodic attack, such as platinum or palladium metal or other metal of the platinum group or oxides of such metals, or of titanium metal coated with such metals or oxides. The anodes may be composed of or have a surface composed of titanium boride ($TiB_2$) or boron nitride, chromic oxide, ceric oxide, etc.

Also mounted in the furnace floor are (optional) thermocouples 77 which can be used to measure the temperature of molten glass adjacent such floor, wires running from the thermocouple to a temperature-sensing device.

As shown in FIG. 2, one cathode and three sets of anodes are similarly mounted in the floor of the furnace. There are two banks of separate anodes 55-52-54 and 56-53-57, both of which are downstream of the cathode. These anode banks comprise anode separated segments 55, 52 and 54 in the upstream bank and 56, 53 and 57 in the downstream bank. Each segment is electrically isolated from other segments and is separately connected to the positive pole of a DC source.

The segments in one anode bank are about 2.5 centimeters wide and a total of 60 centimeters long. Thus side segments each provide an area of about 37.5 square centimeters and the center segment about 75 square centimeters (the total being 150 square centimeters) which can generate gas bubbles which rise unobstructed through a free space in the pool above the anode segments. However, they may be wider, for example 30 to 60 centimeters or more in width in larger furnaces. They may be connected to the same potential source if desired. Alternatively, a variable resistor may be inserted between one or two or all of the segments so that the segments can be adjusted to have different anode potentials. This makes it possible to control bubble size or rate of bubble generation at a particular location.

For example, by applying a higher anode potential on segments 52 and 53 than on segments 55, 54 and 56, 57, a greater degree of glass lifting and agitation can be produced in the central area of the pool. This may be desirable where it is desired to obtain strong agitation while at the same time avoiding excessive flow rate and consequent wear of refractory at the side walls.

Conversely the higher potential may be applied to the side segments 55, 54 and/or 56, 57 in order to generate a greater density of bubbles on the sides and thus to ensure a more uniform temperature profile of the glass pool across the width of the furnace chamber and compensate for loss of heat through the side walls. In addition, electrodes of the downstream bank may be higher or lower in anode potential than the anode potential of the upstream bank.

When both banks of these anodes are operating, it will be understood that (referring to FIG. 1) the downstream bank influences stream E while the upstream bank influences current H. Thus, one may raise the voltage imposed on the downstream bank while holding the voltage on the upstream bank constant, or vice versa. Other modes of adjustment will suggest themselves to those skilled in the art for particular purposes.

Furthermore, a greater volume of bubbles may be generated by one bank than by the other parallel bank.

The distance between the banks conveniently may be 15 to 30 centimeters. However, the banks may be spaced from each other substantially more greatly, for example 150 to 300 centimeters or more. Each bank tends to create its own spring zone and thus pluralities of spring zones may be created downstream from each other and thus a wide variety of patterns of glass current flow may be generated or enhanced.

Most glass batches contain small amounts of iron and other metals. Reduction tends to occur at the cathode. Thus, ferric iron is reduced to ferrous iron and pentavalent antimony to trivalent antimony. While metallic sodium or metallic silicon may be deposited, this effect is minimal or nonexistent where enough iron, antimony or other metal ion of a metal having two or more valences, the metal of the ion being in a higher valent state and being more electropositive than silicon, is present, because these materials are preferentially reduced so long as the density of current flow is held low enough to avoid local depletion of the iron, arsenic and/or antimony or other metal ion in its higher valent state. This iron or like metal is present as a component of the glass pool, probably as a silicate or oxy compound combined with the silica structure of the molten glass. For example, ferric iron is reduced to ferrous ion but not to metallic iron. Antimony and arsenic are reduced from pentavalent state to trivalent state.

In the course of the electrolysis reduction reactions take place at the cathode. As long as iron is present, the iron present in ferric state is selectively reduced preferentially to a lower valent state. However, by holding the cathode area large enough and/or the cathode voltage with respect to the pool and/or the extent of electrolysis low enough and/or by maintaining the ferric iron concentration in the pool high enough, the reduction reaction is confined to conversion of ferric iron to ferrous iron. Thus no metal deposition takes place. So long as reducible ions of metals which have two or more valent states and which are more electropositive in the electromotive series than silicon (sodium being considered electronegative and gold electropositive) are present in the glass in contact with the cathode and such ions are in their higher valent state, no appreciable deposition either of silicon or the more electropositive metal occurs. Since the density of current applied to the cathode is relatively small, only small amounts of these agents, e.g. 0.05 to 3 percent of the batch weight, need be present.

The glass contacting the cathode may become locally stained for example due to ferrous ion thus generated. This stain can be effectively eliminated if the gas generating anode is downstream of the cathode since these stain streaks, if formed, become well mixed with other glass in the bubble zone and vanish.

Recourse to several banks or groups of anodes of tin oxide is advantageous. When potential is first applied between anode and cathode at a voltage over 1.5 volts (say, 2 – 10 volts), bubbles do not appear immediately at the surface of the glass. After one or two minutes, effective bubbling, such as to create substantial currents in the glass, takes place and continues for several hours. However, as time passes, the voltage required to propagate such bubbling increases and may rise for example from 2 – 3 volts to 10 – 15 volts. However, by stopping current flow to the anode for a time, say one half to 1 hour, the anode activity or function becomes restored. Thus, it is convenient to alternate the use of anodes, so that some of the anodes are operating while others are not but rather are being restored for (while yet in contact with the molten glass) further use. Thus, bank composed of segments 55, 52 and 54 may be operated while bank of segments 56, 53 and 57 is disconnected and vice versa. Both banks have the same polarity. That is, both are connected to the positive pole of a DC source of power. However, the voltage imposed may be different to compensate for different distances of the banks from the cathode or for other reason.

Figure 4:
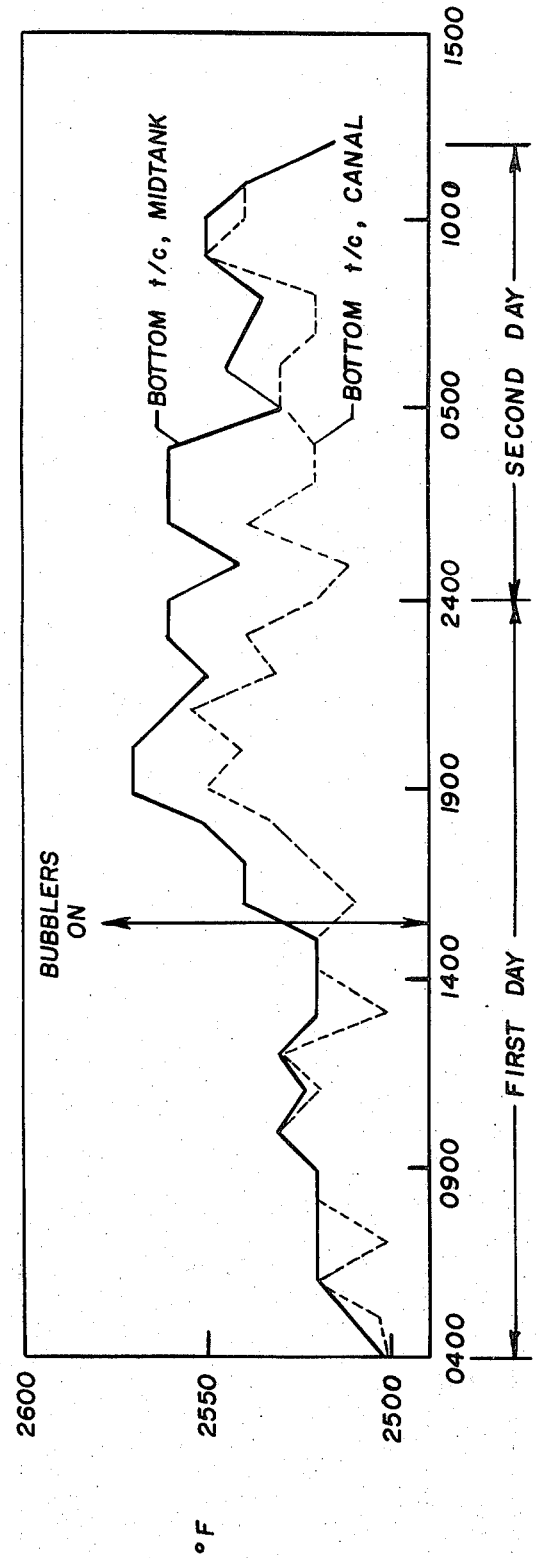

FIG. 4 illustrates typically the way in which the bubbles generated by the electrolysis may influence the temperature of the glass pool, particularly at the bottom thereof. This is a chart which was taken in a test of glass melting using the furnace illustrated in FIGS. 2 and 3. By the beginning of the first day of operation of this gas fired furnace, the furnace had been brought up to temperature by gas firing above the level of a typical soda-lime glass pool in the manner conventionally known. Glass was continuously withdrawn and glass batch continuously fed to the pool. The furnace chamber was 24 inches wide and 36 inches long and was provided with a 4 inch by 6 inch feeder doghouse centrally located at the back end of the furnace as well as 16 inch square delivery canal at the exit end of the furnace. The bottom consisted of a 4 inch slab of clay refractory paved with 3 inches of a fusion-cast alumina-zirconia refractory such as "Monofrax S." The cathode 60 was a molybdenum plate about 7.6 centimeters wide (measured in the direction of glass flow) and 27.9 centimeters long (measured across the chamber) and 0.63 centimeters thick. The anodes 51, 52, 53, 54, 55, 56 and 57 were square bars of conductive tin oxide about 2.5 centimeters square. The side electrodes were 15 centimeters long and the middle electrodes were 30 centimeters long. The electrodes were set in slots in the furnace floor. Anode 51 was about 7.5 centimeters from cathode 60 and anode 53 and anode 52 were 30 centimeters and 7.5 centimeters respectively from cathode 60. The anode segments 55, 52 and 54 and 56, 53 and 57 respectively were aligned perpendicular to the side wall of the chamber and connected to the same DC potential. Glass flowed through the furnace at a rate of about 1.05 liters per hour. The ferric iron in the feed remained at about 0.13 percent of the weight of the finished glass.

During the period 0400 to about 1500 hours of one day (called the first day), the temperature of the glass at the bottom remained at about 2,500 to a maximum of about 2,530°F. At about 1,500 hours of the first day a DC electric potential of about 3 volts was turned on between cathode 60 and anodes 55, 52 and 54, and the voltage thereafter was maintained high enough to cause direct current of 5 amperes (about 0.03 amperes per square centimeter or 300 amperes per square meter) to flow through the glass, thus generating bubbles electrolytically over the upper face of the anodes. This generates oxygen at about the rate of 6.7 liters per hour measured at conditions of temperature and pressure in the furnace. The amount of oxygen is calculated according to Faraday's law assuming 4 Faradays per mol of oxygen. This was continued until about 1,000 hours of the next day. During this period the anode connection was repeatedly interchanged between anodes 55, 52 and 54 and then anodes 56, 53 and 57. The average interval of time between changes was about 90 minutes. The bottom temperature of the glass rose about 40°F shortly after bubbling commenced and remained at this level during the experiment.

In the above embodiments the electrodes are shown as being located at the bottom or at least in the lower third of the pool. This is advantageous not only because the evolved bubbles can influence the pool over substantially its entire depth but also because the solid electrodes do not obstruct glass flow. However, it should be understood that the electrodes may be disposed at a higher level for special purposes. For example, as shown in FIG. 1 current D flows downstream while current E flows upstream along the bottom of the pool. A relatively quiescent zone is established between these currents, as indicated by broken line X, if desired, stirring may be confined to the portion of the pool in the zone X, or at all events, above current E, by locating the electrodes at this level. Even in such case, however, the electrodes are designed and oriented so that the major part of the evolved bubbles are formed on the upper surface of the electrode and provide unobstructed flow of glass from the lower portion to the top portion of the pool. Of course, bubbles may evolve from sides of an anode; ordinarily, this is unobjectionable.

The invention has been described with particular reference to soda-lime glasses suitable for flat glass production. Such glasses have the following composition:

| | |
|---|---|
| $SiO_2$ | 60 to 75% |
| $Na_2O$ | 11 to 20% |
| $K_2O$ | 0 to 10% |
| $K_2O + Na_2O$ | 11 to 21% |
| CaO | 6 to 16% |
| MgO | 0 to 10% |
| CaO + MgO | 6 to 20% |
| $Al_2O_3$ | 0 to 5% |
| $Fe_2O_3$ | 0 to 1% |
| $SO_3$ | 0.1 to 0.5% |

Small amounts of other metals such as arsenic, antimony, selenium, etc., may be present if desired.

Those skilled in the art are well aware of how to make such soda-lime glasses from usual raw materials such as sand, soda ash, salt cake, lime, dolomite, alumina, coal, rouge, etc. The temperature-viscosity characteristics of such glasses are well known. For the most part, the instant invention is practiced upon such glass while it is in a melter zone of a furnace, such that the glass is at a viscosity that is rarely above 2,000 poises, preferably being about 50 to 200 poises and only infrequently above 500 poises. Of course, there is not in principle any reason why the instant invention may not be used for the making of foam glass. In such use of the invention, the glass into which the bubbles are released preferably is of a higher viscosity than that mentioned above, and as needed or desired, means are provided to cool the surface of the glass and thereby stabilize the foam glass or glass foam as it is formed.

It will be understood that the invention is applicable similarly to other ionically conductive glasses including those produced for production of glass containers, ophthalmic lenses and glass fibers ("E" Glass). It may also be applied to borosilicate glasses although at higher temperatures and also to phosphate or sodium borate glass at lower temperatures. Sodium silicate (water glass) having the composition $Na_2O (SiO_2)_x$ where $x$ ranges from 0.5 to about 4 may be produced in the same way.

Colored glass may be produced uniformly by feeding colorant into the spring zone or an area upstream of the spring zone. Where a pair of anode banks are used, the colorant may be fed into the agitation zone created by the first bank of anodes and stirred or attenuated by the zones of agitation or flow created by each bank.

Both anode and cathode discussed above have been stated to be in contact with the molten glass pool and in this case both anodic and cathodic reactions must be given consideration. It is possible to change, minimize or reduce this problem by interposing between anode and cathode a solid ion permeable member which does not permit or at least restrains flow of glass therethru. This member may be permeable to anions or cations of the bath and thus is capable of use as a solid electrolyte. A cation permeable barrier permits passage or electrolytic migration of cations from one side of the barrier to the other while restraining migration of anions. An anion permeable barrier permits electrolytic migration of anions while restraining migration of cations or components of the bath.

Beta alumina, such as the products "Monofrax H" and "Monofrax M" manufactured by Harbison-Carborundum Corporation of Falconer, N.Y., is a typical suitable cation permeable material. Beta alumina has the formula $M Al_{11}O_{17}$ or $M Al_5O_8$ where M is a cation such as a monovalent cation such as sodium or other alkali metal.

A typical material of this type is a dense cast refractory having the following analysis:

|  | by weight |
|---|---|
| $Al_2O_3$ | 94.81% |
| $Na_2O$ | 3.59% |
| $SiO_2$ | 1.09% |
| $Fe_2O_3$ | 0.06% |
| $CaO$ | 0.28% |
| $MgO$ | 0.15% |
| $TiO_2$ | 0.02% |

It is a mixture of 45 percent alpha alumina ($Al_2O_3$) and 55 percent beta alumina ($Na_2O\ 11\ Al_2O_3$).

As shown in FIG. 2, blocks 133 of beta alumina may be disposed in the side walls 109 of the furnace. A cathode 130 is disposed within the blocks 133. Conveniently this may be molten tin or a molten alloy of tin and sodium and poured into the recess in the blocks provided for the cathode, with suitable means (not shown) for retaining the tin in the block and connecting it to the negative DC pole. The blocks 133 are in contact with the molten glass and thus current flows from the cathode 130 through the block 133 and the molten glass to the anodes 51 to 57 which are connected to the positive DC pole.

Ions of alkali metal such as sodium migrate from the molten glass and through the beta alumina block to the external cathode of molten tin or the like, and thus the molten tin gradually is converted to a sodium-tin alloy which may be withdrawn, the sodium removed, and the tin returned. Obviously the cathode may be molten sodium, and in such a case the need for purification of the cathode eliminated. In such a case, sodium is withdrawn periodically or continuously as desired. Other liquid alloys of sodium may be used as the cathode, such as liquid lead-sodium. Voltage imposed is not substantially greater than when the electrode is in contact with the glass melt unless the thickness of the beta alumina is excessive.

These more remote electrodes may be located in the end walls or even in the bottom of the furnace simply by constructing such furnace so that such end walls or floor in contact with the glass are of beta alumina blocks and have the cathodes either in the beta alumina blocks or on the opposite side thereof.

These blocks may also be doped with small amounts of lithium or silver to improve electroconductivity.

Anion-permeable refractory may be used, interposed between anode and cathode. Such blocks may be constructed of lime- or yttria-doped zirconia or other cubic oxides with a fluorite structure. See reprint of article of M.S. Whittingham and R. A. Higgins for *5th Materials Research Symposium Solid State Chemistry, Novel High Temperature Materials*, National Bureau of Standards, Gaithersburg, Md., Oct. 19, 1971.

To demonstrate that the beta alumina can effectively serve to separate anode and cathode in a molten bath of a glassy material, the following test was made:

An octagonal piece of beta alumina one-half inch on a side and 3 inches long was drilled to produce a central cavity about one-half inch in diameter and about 2¾ inches deep. The core was filled with metallic tin to about 1 inch from the top. This piece was immersed 1 inch deep in a pool of molten borax in a 4-inch-diameter crucible, the temperature of the borax being established at about 1,700°F. The tin thus became molten. It was connected to the negative pole of a direct current electric potential source.

A tin oxide anode 1.09 inches square was placed close to the floor of the borax pool spaced from, but under, the beta alumina and connected to the positive pole of the DC source. The voltage applied and resulting current were as follows:

| Amperes | Volts |
|---|---|
| 0 | 2 |
| 0.2 | 3.3 |
| 0.4 | 4.2 |
| 0.6 | 4.9 |
| 0.8 | 5.6 – 6.0 |
| 1.0 | 7 – 9 |

Sodium metal was deposited in the molten tin in the core, thus forming a liquid sodium-tin metal alloy or mixture. Gas bubbles evolved at the anode and created an upward movement of the glass therefrom.

While in the above description the cathode is described as being in contact with the solid electrolyte (beta alumina) barrier, this is not essential since the barrier may be interposed between and spaced from both electrodes. In such a case the cathodic reactions may be isolated from the anodic reactions as is well understood in the operation of diaphragm cells. The glass in such a case may be the molten electrolyte of both anolyte and catholyte. However, the anolyte and catholyte may be of different composition.

For example, on the cathode side of the barrier, molten alkali metal silicate having the formula $Na_2O(SiO_2)_x$ where $x$ is 1 to 5 may be disposed between the barrier and the cathode. In such a case, the molten glass pool from which glass; e.g., soda lime glass is produced may be regarded as the anolyte and contains the gas forming anode disposed and operated as above described.

In the above embodiments the heat supplied to melt the glass forming ingredients and keep the glass molten during melting and/or fining is supplied by burning fuel and projecting the flame with products of combustion and heat produced thereby above the molten glass pool. In flat-glass production all or substantially all of the heat requirements come from such combustion. Of course, small electrodes are occasionally placed in the melt and an AC potential applied to supply localized heating and/or to influence heat currents. However, this amount of heat usually is small, being less than 5 to 10 percent of the total heat input to the furnace.

The process may, however, be applied to glass which is heated electrically by AC electrodes disposed in the melt. Electric heating of this type is frequently resorted to for small furnaces used to produce container glass or for glass furnaces used to produce high-melting-point glasses such as borosilicate glasses. Three possibilities exist. First, a separate set of electrodes powered by direct current is used for the anodic bubbling. Second, only one of the two alternating-current electrodes is used for part of the direct-current circuit. Third, a direct-current component is suitably superimposed over the alternating current, using the same electrodes. In any event, the heat generated that is attributable to the direct current is small, being less than 5 to 10 percent and usually below one percent of the total heat supplied to the furnace to melt the glass. A practice of this kind is to be distinguished from the kind of bubbling hitherto observed when high densities of alternating current are used for heating molten glass; in such prior-art heating, the bubbling is relatively sporadic and undependable, and not ordinarily concentrated at either one of the electrodes, and ordinarily looked upon as a hindrance or drawback, indicating the inefficiency of the heating operation, whereas the instant practice gives dependable bubbling, concentrated at a desired location, and is regarded as a positive benefit.

Primarily gas bubble generation is achieved at the anode with evolution of oxygen as a product of the electrolysis. Other gases such as chlorine may be evolved by incorporating alkali metal chloride in the melt. In some glasses, water in small amount may be present in the melt, at least in its early stages, particularly where the glass forming ingredients contain water or evolve water in the glass formation process, e.g., when sodium hydroxide in aqueous media is used in lieu of alkali metal carbonate. Electrolysis of the melt in such cases can also result in evolution of hydrogen at the cathode which, when the cathode is in contact with molten glass, produces bubbles which affect the melt in a manner similar to the bubbles generated at the anode.

As shown in the drawings and as described, the anodes extend across essentially the entire width of the furnace or canal from which glass ultimately flows to an exit. This ensures the attenuation and/or homogenization of the entire body of glass. However, it is not necessary that bubbles be generated electrolytically across the entire glass pool or canal and in some cases localized generation of such bubbles for example in a central area or at the sides between downwardly directed stirrers may be advantageous. The bubble-generating electrodes should extend across a substantial portion of the width of the pool and rarely is less than ten percent, usually across 50 percent or more of such width.

Thus, the instant invention affords a novel means and method for generating within molten material such as glass a multiplicity of bubbles of gas that are relatively smaller in size than ones conventionally hitherto produced in such material, and it will be apparent that such bubble generation may be practiced in any location, using any desired configuration of bubbler means, and for most of the various purposes for which bubbling has hitherto been done-homogenization or mixing, influencing convection currents, purging the melt of seeds or of dissolved gases, or making foam glass.

Anodic bubbling can be used to decrease the contained-water content of molten soda-lime glass. The contained-water content of such glass is usually on the order of less than 0.1 weight percent. As mentioned hereinabove, a decrease in contained-water content tends to promote the service life of light bulbs made from such glass. A test was conducted in an alumina crucible, soda-lime glass being held therein for 2.2 hours at 1,300°C and subjected to anodic bubbling under conditions in accordance with the instant invention (voltage of 1 to 2.5 volts,) current density of 17 milliamperes per square centimeter of anode surface. Absolute values for water content, before and after, are not available since the water content was determined from infra-red absorption data. From such data, there are obtained "infra-red absorption coefficients" that have units of reciprocal centimeters and are proportionate to the water content, i.e., a 20 percent change in such coefficient indicates a 20 percent change in water content. In such tests, the glass before bubbling had coefficients of 2.47 and 2.68 cm.$^{-1}$ for wavelengths of 2.86 and 3.54 microns, respectively; after bubbling for 2.2 hours as aforesaid, the absorption coefficients were 1.94 and 2.10 cm$^{-1}$, respectively. This indicates a decrease in water content on the order of 20 to 25 percent.

An experiment has been conducted which establishes the feasibility of using an external cathode that is separated from a body of molten glass by an anion-permeable material. Into a cylindrical crucible three-fourths inch in diameter, 1½ inches high, having a wall thickness of one-sixteenth inch, there was placed quantity of soda-lime glass sufficient to fill the crucible approximately half full. The crucible was made of lime-stabilized zirconia refractory. The crucible so prepared was placed onto a platinum disk or tray, onto which there had first been placed some granular tin oxide refractory material. A platinum member was inserted into the glass in the crucible, and electrical connections were made between the platinum tray and the negative pole of a direct-current source, and between the platinum member in the glass and the positive pole of the direct-current source. The crucible and tray were placed into a tube furnace and heated to about 2,500°F. At a reasonable impressed voltage, a current flow was obtained, and bubbling was produced within the molten glass in the crucible. The platinum, tin oxide, crucible, and glass did not appear to be adversely affected by the procedure described above. This leaves the glass composition unchanged by the bubbling.

Although the present invention has been described with particular reference to the details of certain embodiments thereof, it is not intended that such details shall be regared as limitations upon the scope of the invention except insofar as included in the accompanying claims.

What is claimed is:

1. A process for treating a pool of an ionically conductive molten glass, which upon electrolysis can yield a gaseous product comprising subjecting the pool of molten glass to direct current electrolysis between a pair of electrodes separated by molten glass, generating gas bubbles at at least one of said electrodes, interposing an ion permeable solid electrolyte barrier between the molten glass separating said electrodes and one of said electrodes from the molten glass whereby to shield said last named electrode from said molten glass so that an electrode product is collected at said last named electrode.

2. The process of claim 1 wherein said shielded electrode is a cathode and said solid electrolyte is cation permeable.

3. The process of claim 1 wherein said ion permeable solid electrolyte barrier is beta alumina.

4. The process of claim 1 wherein gas bubbles are generated at an anode in contact with the glass and sodium metal is deposited at a cathode which is separated from the anode by a cation permeable barrier.

5. The process of claim 4 wherein said cation permeable barrier is beta alumina.

6. A glass furnace having a chamber for holding a molten pool of glass, a pair of opposed electrodes at least one of which is in contact with the molten pool of glass and means to apply a DC potential between said electrodes, said electrodes being separated by an ion permeable solid electrolyte barrier which shields one of said electrodes from substantial contact with the molten pool of glass.

7. The furnace of claim 6 wherein the electrode in contact with the glass is an anode and the shielded electrode is a cathode.

8. The furnace of claim 7 wherein the cathode comprises liquid metal.

9. The furnace of claim 8 wherein the cathode comprises a member of the group consisting of liquid tin, liquid sodium and liquid alloys of tin and sodium.

10. The furnace of claim 6 wherein said ion permeable solid electrolyte barrier is cation permeable.

11. The furnace of claim 6 wherein said ion permeable solid electroy barrier is beta alumina.

12. A method of treating ionically conductive glass which comprises electrolyzing the molten glass by passing a direct electric current through the molten glass between a pair of electrodes, one in contact with the molten glass and the other separated from the first and shielded from the molten glass by an ion permeable solid electrolyte barrier and collecting an electrode product at said shielded electrode.

13. The method of claim 12 wherein said ion permeable solid electrolyte barrier is cation permeable.

14. The method of claim 13 wherein said ion permeable solid electrolyte barrier is beta alumina.

15. A process for treating a pool of molten ionically conductive glass wherein glass forming ingredients are introduced at a feed point in a furnace, the ingredients are melted on contact with a molten pool of said glass and the molten glass of said pool flows forward from a melting zone to a forming zone, the improvement which comprises electrolyzing said glass by passing a direct electric current through the molten glass between a pair of electrodes in a lower portion of the molten pool and thereby generating gas bubbles along a gas electrode which extends transversely to the path of flow of molten glass and causing said bubbles to rise through the pool in sufficient volume to cause upward movement of glass in the pool and interposing an ion permeable solid electrolyte barrier between said gas forming electrode and an opposed electrode.

16. The process of claim 15 wherein the solid electrolyte is cation permeable.

17. The process of claim 15 wherein the solid electrolyte is beta alumina.

18. The process of claim 1 wherein the solid electrolyte is anion-permeable.

19. The process of claim 18 wherein the barrier is a cubic oxide with a fluorite structure.

20. The process of claim 19 wherein the barrier is lime-doped zirconia.

21. The process of claim 19 wherein the barrier is yttria-doped zirconia.

* * * * *

UNITED STATES PATENT OFFICE
CERTIFICATE OF CORRECTION

Patent No. 3,811,859  Dated May 21, 1974

Inventor(s) Fred M. Ernsberger

It is certified that error appears in the above-identified patent and that said Letters Patent are hereby corrected as shown below:

Claim 11, column 19, line 26, "electroy" should read -- electrolyte --.

Signed and sealed this 1st day of October 1974.

(SEAL)
Attest:

McCOY M. GIBSON JR.
Attesting Officer

C. MARSHALL DANN
Commissioner of Patents